United States Patent [19]
Wright et al.

[11] Patent Number: 5,616,353
[45] Date of Patent: *Apr. 1, 1997

[54] METHOD FOR EXTENDING SHELF LIFE OF CITRUS JUICE

[75] Inventors: Robert V. Wright, Arden; Ann Marie Chuprevich, Horse Shoe, both of N.C.

[73] Assignee: Champion International Corporation, Stamford, Conn.

[ * ] Notice: The term of this patent shall not extend beyond the expiration date of Pat. No. 5,324,528.

[21] Appl. No.: 185,283

[22] Filed: Jan. 24, 1994

Related U.S. Application Data

[60] Division of Ser. No. 927,034, Aug. 10, 1992, Pat. No. 5,324,528, which is a continuation-in-part of Ser. No. 775,017, Oct. 11, 1991, Pat. No. 5,175,036.

[51] Int. Cl.$^6$ ............................... A23L 3/34; B65B 55/00
[52] U.S. Cl. ........................................... 426/324; 426/398
[58] Field of Search .................................... 426/127, 324, 426/398

[56] References Cited

U.S. PATENT DOCUMENTS 4,698,246  10/1987  Gibbons et al. .................... 426/127 X
4,701,360  10/1987  Gibbons et al. .................... 426/127 X Primary Examiner—Leo B. Tentoni

[57] ABSTRACT

A composite barrier laminate for a carton for citrus juices that extends the shelf life of the citrus juice by inhibiting the proliferation of microbial growth therein. The composite barrier laminate has a plurality of layers with one layer being a thin barrier skin coat in contact with the juice. The skin coat is impervious to the antimicrobial agent D-limonene and is effective to prevent the migration of the D-limonene found in the citrus juice. A method for extending the shelf life of a citrus juice stored in a paperboard carton for preventing the D-limonene present in the citrus juice stored in a carton from migrating into the carton structure by making the innermost layer of the carton impervious to D-limonene is disclosed as is a method for preserving the antimicrobial properties present in a citrus juice that is stored in a paperboard carton formed from a laminate by preventing migration of D-limonene from the citrus juice into the laminate by making the innermost layer impervious to D-limonene.

6 Claims, 1 Drawing Sheet

METHOD FOR EXTENDING SHELF LIFE OF CITRUS JUICE

RELATED APPLICATIONS

This application is a continuation division of application Ser. No. 07/927,034, filed Aug. 10, 1992, which is now U.S. Pat. No. 5,324,528, which application is a continuation-in-part of application Ser. No. 775,017, filed Oct. 11, 1991, issued to U.S. Pat. No. 5,175,036.

BACKGROUND OF THE INVENTION

The present invention relates to a composite barrier laminate for a carton for citrus beverages including juices and other liquids. More particularly, it relates to a composite barrier laminate for a carton for citrus juices that extends the shelf life of the citrus juice by inhibiting the proliferation or growth of microorganisms. The composite barrier laminate has a barrier skin coat layer that is impervious to the antimicrobial agent D-limonene so that it prevents the migration of D-limonene from the citrus juice.

The present invention also relates to a method for extending the shelf life of a citrus juice stored in a paperboard carton. The method comprises preventing the antimicrobial agent D-limonene present in the citrus juice stored in the carton from migrating into the carton structure by making the innermost layer of the carton structure impervious to D-limonene. The present invention provides a method for preserving the antimicrobial properties present in citrus juice that is stored in a paperboard carton or container by preventing the migration of D-limonene from the citrus juice by storing the citrus juice in a carton formed from a laminate having an innermost layer that is impervious to D-limonene.

The prior art believed that flavor degradation in citrus juice and other citrus beverages during storage in the preferred polyethylene coated cartons was caused by the loss of essential "flavor" oils. Accordingly, laminate structures that prevent the loss of "flavor" oils in order to avoid flavor degradation are now known in the art.

The present invention unexpectedly found that with the growth of microorganisms, such as, for example, yeast, mold and bacteria, flavor changes or defects in a citrus juice occur. The present invention also found that D-limonene in citrus juices, such as orange juice, acts as a strong antimicrobial agent that inhibits the proliferation of microorganisms which, in turn, extends the shelf life of the juice. It is believed that when D-limonene migrates into and is absorbed in the polyethylene coating of a carton, the microbial growth in the citrus juice after eight weeks can be one hundred times greater than its initial condition.

Heretofore, the useful shelf life of a citrus juice has been limited to a few weeks. It is now believed that the principal reasons are flavor loss due to microbial growth and loss of nutritional value due to the oxidation of ascorbic acid (vitamin C) below the regulation level of 30 mg ascorbic acid per 100 ml. The loss of ascorbic acid can be prevented for seven or eight weeks by using oxygen barrier layers such as polyamide, ethylene vinyl alcohol (EVOH) or polyethylene terephthalate (PET). Nevertheless, whether the juice is held in non-oxygen barrier or oxygen barrier cartons, flavor loss can become noticeable within about two weeks because as much as thirty percent of the D-limonene in the citrus juice may be absorbed into the heat seal coating layer within a few days. This is known as scalping.

Glass containers and molded plastic containers have been used to store and transport juice. However, both have a number of disadvantages, including shipping costs for the empty containers, disposal problems, breakage and weight problems.

To obtain the advantages of comparatively low container weight, ease of sealing and opening, ease of disposal and low shipping volume for empty containers, since such containers can be shipped in a collapsed condition, containers based on a paperboard substrate are the current choice for marketing citrus juice and other products. These cartons are known in the trade as "gable top" containers or cartons. Such a carton is described in U.S. Pat. No. 3,120,333. These gable top cartons use low density polyethylene as the preferred food-contact polymer.

It has, however, been found that low density polyethylene (LDPE) has a very high absorption and migration capacity for D-limonene. Unless a D-limonene barrier layer is part of the container construction, migration can result in as much as a 60% loss of D-limonene before the expiration of the container's sale date.

The prior art has provided laminates having a metal foil layer to retain the vitamin content and flavors in the juice for a substantial period of time, about ten weeks. The skin coat layer is not, however, the metal foil layer. Also, these laminates do not address the issue of inhibiting the migration or the resultant loss of the antimicrobial agent from the citrus juice. Further, metal foil laminate containers are expensive when compared to non-metal foil laminate containers, and are prone to develop pin holes that seriously affect their ability to contain liquids.

While considerable efforts have been devoted to finding the best layer structure in a barrier laminate, such efforts have failed to appreciate the superior and unexpected results of longer shelf life which is achieved by providing a thin skin coat layer that is impervious to D-limonene to prevent the migration of D-limonene from the citrus juice.

For example, U.S. Pat. No. 4,513,036 describes a laminate useful in making a paperboard based carton for juices, that provides an effective barrier to the migration of essential oils and/or flavors, and does not contain a metal foil. This laminate has a paperboard substrate, a polypropylene polymer layer coated thereon and a polyolefin layer applied onto the polypropylene polymer layer.

A laminate that provides an effective barrier to oxygen and, thus, helps retain vitamin C in the juice stored in the carton is described in U.S. Pat. No. 4,777,088. This laminate comprises from the outer surface to the inner surface which would contact the juice, a paperboard substrate, a nylon layer coated directly on the paperboard substrate, a layer of poly(ethylene-co-methacrylic acid) partially neutralized with sodium and zinc cations (Surlyn) directly overlying and in contact with the nylon layer, and an inner polyolefin layer in contact with the Surlyn layer. The nylon barrier layer helps retain vitamin C and, in addition, essential oils and flavor as does the laminate in U.S. Pat. No. 4,513,036.

Likewise, other barrier laminates that are capable of excluding oxygen and preventing the loss of oils and/or flavors are described in U.S. Pat. Nos. 4,977,004, 4,977,009, 4,950,510, 4,861,526, 4,835,025, 4,806,399, 4,753,832, 4,701,360 and 4,698,246. In U.S. Pat. Nos. 4,701,360, 4,861,526 and 4,698,246, both sides of a paperboard substrate are first flame treated and a layer of low density polyethylene is applied to the outside surface. To the surface of the paperboard that becomes the inside surface of the carton, a layer of low density polyethylene is initially applied directly to the paperboard, followed by a nylon barrier layer that is applied to that interior low density polyethylene layer with a bonding tie layer between the nylon and the polyethylene. Lastly, an innermost skin layer is applied to the nylon with another tie layer to improve the adhesion of the layers and to help in heat sealing. This skin layer is made of ethylene vinyl alcohol copolymer.

U.S. Pat. No. 4,948,640 provides five embodiments for a heat sealable barrier laminate. Each embodiment provides a substantial barrier to loss of vitamin C over an extended shelf life of the carton, namely about eight weeks. Each embodiment further provides that the skin coat layer is a thin layer of a low density polyethylene polymer.

Not one of these patents recognizes that the cause of flavor degradation in citrus juice, such as orange juice, is the proliferation of microbiological organisms or microorganisms that occurs when the D-limonene migrates out of the juice. Accordingly, these patents fail to provide a method for inhibiting the loss of the antimicrobial agent in the citrus juice contained in the carton or, moreover, appreciate that a substantial increase in shelf life can be accomplished by inhibiting the proliferation of the microorganisms by providing an innermost layer that is made of a material impervious to the antimicrobial agent D-limonene thereby retarding the loss of D-limonene from the citrus juice.

Thus, the present invention provides a barrier skin coat that will prevent the migration or loss of D-limonene from the citrus juice, inhibit the growth of microorganisms, and the rapid loss of flavor due the the growth of microorganisms.

SUMMARY OF THE INVENTION

Against the foregoing background, it is a primary object of the present invention to provide a comparatively economical barrier laminate for a carton for a citrus juice including citrus juice and other liquids that improves the shelf life of the citrus juice by inhibiting the proliferation of microorganisms.

It is another object of the present invention to provide such a comparatively economical barrier laminate for a carton for a citrus juice that prevents the loss of the antimicrobial agent D-limonene found in the citrus juice by employing a thin barrier or skin layer effective to prevent the migration of D-limonene in the laminate in which the barrier layer contacts the juice contained in the carton.

It is a further object of the present invention to provide laminates for juice cartons having such a skin layer that, in the absence of an oxygen barrier layer in the barrier laminate, also functions as a limited oxygen barrier.

It is a still further object of the present invention to provide laminates for juice cartons having such a limited oxygen barrier skin layer that retards the loss of vitamin C (ascorbic acid) due to oxidation.

It is yet a further object of the present invention to provide a juice carton constructed of a laminate effective to prevent the migration of D-limonene from the juice into the carton structure.

It is yet another object of the present invention to provide a method for extending the shelf life of a citrus juice stored in a paperboard carton by preventing the antimicrobial agent D-limonene present in the citrus juice from migrating into the carton structure by making the innermost layer of the carton structure impervious to D-limonene.

It is yet still another object of the present invention to provide a method for preserving the antimicrobial properties present in a citrus juice that is stored in a paperboard container by preventing migration of the antimicrobial agent D-limonene from the citrus juice by storing the citrus juice in a container formed from a laminate having an innermost layer that is impervious to D-limonene.

According to the present invention, the laminate providing an effective barrier to the migration of D-limonene from the juice comprises from the outer paperboard surface to the inner surface contacting the juice: a paperboard substrate, a nylon barrier layer contacting the paperboard substrate directly, a first tie layer, a polyethylene heat seal layer, a second tie layer, and an inner skin layer that comes in contact with the fruit juice or contents of the carton made from the laminate. The first tie layer adheres the polyethylene heat seal layer to the nylon layer. The second tie layer adheres the inner skin layer to the polyethylene heat seal layer.

The inner skin layer is preferably made of a material selected from the group consisting of polyamide (nylon), copolyamide, ethylene vinyl alcohol copolymer (EVOH) and polyethylene terephthalate (PET).

Advantageously, the outer surface of the paperboard substrate is provided with a low density polyethylene layer which provides a means for heat sealing the flaps of the cartons made from this laminate.

The comparatively economical laminate of the present invention has outstanding oxygen barrier properties. A citrus fruit juice contained in a carton made from this laminate loses no more than 20 to 25 percent of its vitamin C content in eight weeks.

Because of the failure of D-limonene to migrate, the antimicrobial properties of this juice are preserved contributing greatly to its enhanced shelf life. This finding that D-limonene is possessed of antimicrobial properties is attributable to applicants.

BRIEF DESCRIPTION OF THE DRAWINGS

The foregoing and still other objects and advantages of the present invention will be more apparent from the following detailed explanation of the preferred embodiments of the invention in connection with the accompanying drawings wherein.

DETAILED DESCRIPTION OF THE PREFERRED EMBODIMENTS

The present invention provides that the innermost layer in a citrus juice carton or container must be impervious to the antimicrobial agent D-limonene in order to prevent or inhibit the loss or migration of the D-limonene from the citrus juice into the layers of the carton. By limiting the loss of the antimicrobial agent D-limonene from the citrus juice, it has unexpectedly been found that the flavor of the citrus juice is maintained for a substantially longer period of time thereby correspondingly enhancing the shelf life of the citrus juice.

A citrus juice as defined in this application includes all citrus juices, including orange juice and other liquids. The innermost layer of the carton or container is known as the "skin" or "skin coat" layer. It is the layer of the composite barrier laminate that contacts the juice in the carton.

It has been found as illustrated in the test results set forth in this application that by preventing the antimicrobial agent D-limonene present in the citrus juice stored in a carton from migrating into the carton structure, the flavor of the citrus juice can be maintained longer, thereby enhancing the shelf life of the juice.

The preferred materials that have been found to be impervious to D-limonene are polyamide (nylon), copolyamide, ethylene vinyl alcohol copolymer (EVOH) and polyethylene terephthalate. As discussed below, other materials, namely, PETG and polycarbonate, are impervious to D-limonene and, therefore, can be used as the skin coat layer in the present composite barrier laminate. The present invention may be practiced using a skin layer made of these materials in combination with a variety of different substrate, barrier, tie and heat seal layers as also set forth below.

Figure 1:
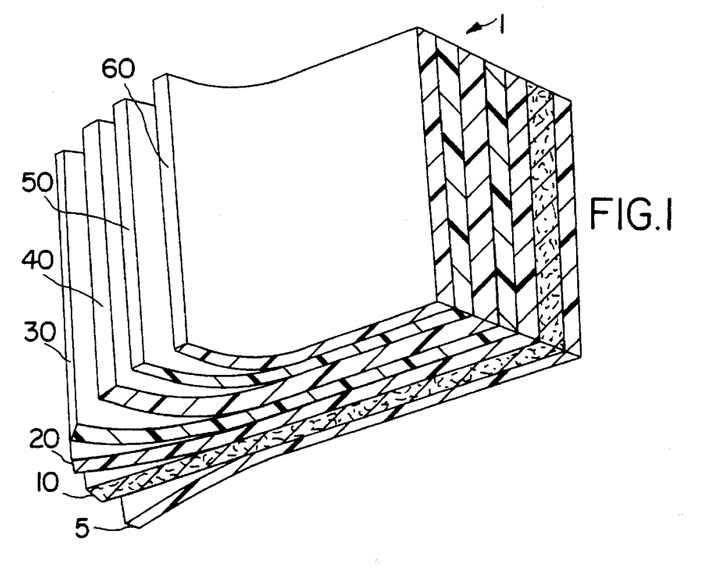
FIG. 1 is a perspective view with the layers separated at one end of a first preferred barrier laminate of the present invention.
Figure 2:
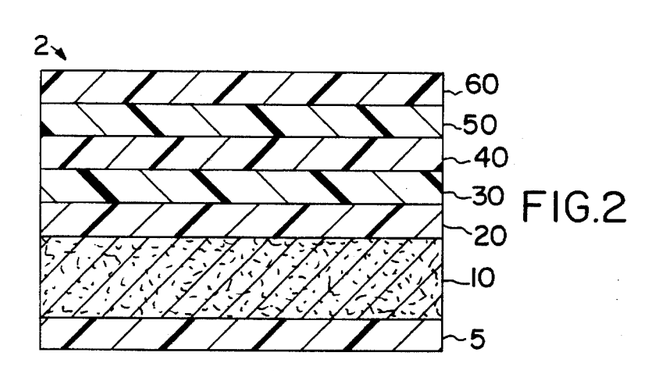
FIG. 2 is a cross-sectional view of the laminate of FIG. 1.

Referring to the drawings and, in particular, FIGS. 1 and 2, there is provided a first preferred barrier laminate of the present invention generally represented by reference numeral 1. The barrier laminate 1 comprises a plurality of layers.

In particular, the barrier laminate 1 includes, in the following order from the outermost layer to the innermost or skin layer, a substrate or base layer 10 having a first or interior surface and a second or exterior surface. There is applied directly to the first surface of the substrate 10, a barrier layer 20. A first tie layer 30 is applied directly to the barrier layer 20, and then a heat seal layer 40 is applied to the first tie layer. Also, a second tie layer 50 is applied to the heat seal layer 40, and a skin or skin coat layer 60 is applied to the second tie layer. In addition, there is preferably applied directly onto the second or exterior surface of the base layer an outer or exterior layer 5.

The exterior layer 5 provides a print surface for a graphics panel. In addition, the exterior layer 5 provides an outer heat seal medium for bonding the carton flaps together and effecting the top and bottom heat seals. The exterior heat seal layer 5 is an olefin polymer and, preferably, is made of polyethylene. In the most preferred embodiment, the exterior heat seal layer 5 is a low density polyethylene. The low density polyethylene layer 5 has a weight of about sixteen (16) pounds per ream.

The substrate 10 provides the barrier laminate 1 with structure, form, strength and rigidity so that the barrier laminate can be formed into a carton. The substrate 10 is composed of a paperboard, preferably a suitable high-grade paperboard. For example, the paperboard substrate 10 could be about 0.010 inches to about 0.028 inches carton stock. In this preferred embodiment, the paperboard is a bleached sulfate paperboard. This material has a basis weight of about one hundred and ninety-five (195) to about two hundred and eighty (280) pounds per ream.

The barrier layer 20 is applied directly onto the paperboard substrate 10 and especially functions as a barrier to oxygen. In this embodiment, the barrier layer 20 is made of a polyamide and is applied directly to the paperboard substrate. This barrier layer 20 is responsible for the barrier laminate's effectiveness in preventing the intrusion of oxygen to the inside of the carton or container. This barrier layer has a coating weight of about three (3) to about five (5) pounds per ream.

The first tie layer 30 is positioned immediately adjacent to and between the barrier layer 20 and the heat seal layer 40 to adhere together the barrier layer and the heat seal layer.

The first tie layer 30 is applied directly onto the barrier layer 20 after the barrier layer has been directly applied onto the paperboard substrate 10.

The first tie layer 30 is preferably made of Bynel E 388 which is marketed by DuPont. The Bynel E 388 first tie layer has a coating weight of about three (3) to about five (5) pounds per ream.

The heat seal layer 40 provides the heat seal bonds that define the structure of the carton. This heat seal layer 40 also provides the liquid tight and gas tight closures of the carton. The heat seal layer 40 is a heat sealable olefin polymer. It is preferably polyethylene, and most preferably a low density polyethylene. The low density polyethylene has a coating weight of about sixteen (16) pounds per ream.

The second tie layer 50 is positioned immediately adjacent to and between the heat seal layer 40 and the skin layer 60. Like the first tie layer 30, the second tie layer 50 functions to adhere together the two adjacent layers, namely the heat seal layer 40 and the skin layer 60. This second tie layer 50, like the first tie layer 30, is preferably made of Bynel E 388. Bynel E 388 is a modified polyethylene resin and is marketed by DuPont. Bynel E 388 has a coating weight of about three (3) to about five (5) pounds per ream. In the second tie layer 50, Plexar 175 can be substituted for Bynel E 388. Plexar 175 is a low density polyethylene based tie layer, and is marketed by Quantum Corp.

Bynel E 369, which is also marketed by DuPont, can be used as the second tie layer 50. Bynel E 369 is a modified low density polyethylene based adhesive resin. It is preferred that Bynel E 369 be used as the second tie layer material if the skin layer is made of polyethylene terephthalate.

The skin layer 60 is the innermost layer of the carton and, therefore, it contacts the beverage or food in the carton. In the present invention the skin layer 60 functions to prevent the migration of the antimicrobial agent D-limonene from the citrus juice into the polyethylene heat seal layer 40.

The skin layer 60 is a very thin layer. The skin layer 60, preferably, is made of a polyamide (nylon). However, the skin layer 60 can be made of copolyamide, polyethylene terephthalate or ethylene vinyl alcohol copolymer. The skin layer 60 has a coating weight of about three (3) to about (4) pounds per ream.

As stated above, if the skin layer 60 is made of polyethylene terephthalate, the second tie layer 50 is preferably made of Bynel E 369.

The skin layer 60 material is not heat sealable. Therefore, the carton side flap, bottom flaps and top seals are formed by applying heat in the form of hot air and closing pressure so that the thin skin layer 60 and the adjacent, thicker low density polyethylene layer become molten and flow together in such a manner that that portion of the skin layer 60 is diluted and does not interfere with the heat seal between the polyethylene heat seal layer 40 and the exterior polyethylene seal layer 5.

Therefore, a typical carton made of the barrier laminate of the present invention should have a low density polyethylene outer layer 5 with a coating weight of about 16 pounds per ream, a bleached sulfate paperboard base layer with a basis weight of about 195 to about 280 pounds per ream, a nylon barrier layer with a coating weight of about 5 pounds per ream, a modified polyethylene (Bynel E-388) first tie layer with a coating weight of about 3 to about 5 pounds per ream, a low density polyethylene heat seal layer with a coating weight of about 16 pounds per ream, a modified polyethylene (Bynel E-388) second tie layer with a coating weight of about 3 to about 5 pounds per ream, and a skin layer with a coating weight of about 3 to about 4 pounds per ream made from either a polyamide, copolyamide, polyethylene terephthalate or an ethylene vinyl alcohol copolymer.

Figure 3:
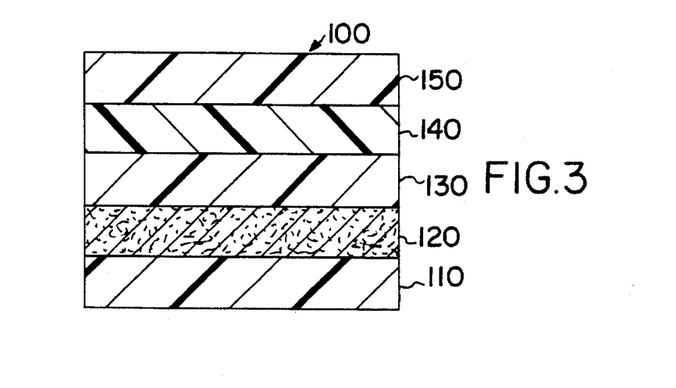
FIG. 3 is a cross-sectional view of the structure of a second preferred barrier laminate of the present invention.

The paperboard and polymer laminate functions as a carton for containing, storing, transporting and dispersing fruit juices, fruit beverage and other beverages and is particularly adapted to those instances that require prevention of microbial growth and migration of D-limonene from the juice into the container structure, resulting in a longer shelf life and a higher quality of product. The laminate barrier as just described has an oxygen barrier that prevents the intrusion of oxygen and resulting loss of ascorbic acid or vitamin C. This latter feature is advantageous since it assists in complying with State and Federal regulations involving citrus juices reconstituted from the frozen concentrate.

layer 120 that has a basis weight of about 195 to about 280 pounds per ream, a low density polyethylene heat seal layer 130 that has a coating weight of about 16 pounds per ream, a tie layer 140 that has a coating weight of about 3 to about 5 pounds, and a skin layer 150 that has a coating weight of about 3 to about 4 pounds per ream. However in this alternative second embodiment, the skin coat layer 150 is made of ethylene vinyl alcohol, instead of polyamide.

In the second embodiment, the skin coat layer 150 also serves as a limited oxygen barrier layer.

As stated above, it is anticipated that in all embodiments of the laminate, the skin coat layer can be PETG, polycarbonate or copolyamide instead of a polyamide, EVOH or PET. It is also anticipated that the laminate could consist of the following alternatives from the outer layer to the inner layer contacting the juice:

| | | | | | | |
|---|---|---|---|---|---|---|
| LDPE | LDPE | LDPE/EVOH | LDPE/EVOH | LDPE | LDPE | |
| BOARD | BOARD | BOARD | BOARD | BOARD | BOARD | |
| LDPE | LDPE | LDPE | LDPE | LDPE | LDPE | |
| POLYAMIDE | TIE | POLYAMIDE | TIE | TIE | TIE | |
| | POLYAMIDE | | POLYAMIDE | FOIL | PET | |
| | | | | TIE | TIE | |
| | | | | POLYAMIDE | POLYAMIDE | |
| LDPE | LDPE | LDPE | LDPE | LDPE | LDPE | LDPE |
| BOARD | BOARD | BOARD | BOARD | BOARD | BOARD | BOARD |
| LDPE | POLYAMIDE | TIE | TIE | LDPE | PET | TIE |
| TIE | TIE | POLYAMIDE | EVOH | TIE | TIE | PET |
| PETG | LDPE | TIE | TIE | PVDC | LDPE | TIE |
| TIE | TIE | LDPE | LDPE | TIE | TIE | LDPE |
| POLYAMIDE | POLYAMIDE | TIE | TIE | POLYAMIDE | POLYAMIDE | TIE |
| | | POLYAMIDE | POLYAMIDE | | | POLYAMIDE |

Another advantage of the laminate barrier is that it has a "skin coat" barrier, namely layer 60, that prevents the absorption of essential oils and flavors into the polyethylene heat seal layer 40 so that flavor components of the juices do not change.

In addition, the heat seal layer 40 provides heat seal bonds that define the structure of the carton and provide liquid and gas tight closures.

Thus, the present barrier laminate provides all the desired properties for a paperboard juice carton.

In the second embodiment shown in FIG. 3, the barrier laminate 100 comprises an outer heat seal layer 110 applied onto a paperboard layer 120, a heat seal layer 130 applied to the outer surface of the paperboard layer, a tie layer 140 applied to the heat seal layer, and a skin layer 150 applied to the tie layer.

In the second embodiment, the outer seal layer 110 provides a print surface for a graphics panel. The outer seal layer 110 is made of low density polyethylene (LDPE) that has a coating weight of about 16 pounds per ream. The paperboard layer 120 is a bleached sulfate paperboard substrate that has a basis weight of about 195 to about 280 pounds per ream. The heat seal layer 130 is made of low density polyethylene. It, like the outer seal layer 110, has a coating weight of about 16 pounds per ream. The tie layer 140 is made of Bynel E 388 and has a coating weight of three to five pounds per ream. In this embodiment, the skin or innermost layer 150 is made of polyamide. The polyamide skin layer 150 has a coating weight of about 3 to about 4 pounds per ream.

In an alternative to the second embodiment, the barrier laminate 100 also comprises a low density polyethylene outer heat seal layer 110 that has a coating weight of about 16 pounds per ream, a bleached sulfate paperboard substrate By making the thin skin layer impervious to D-limonene, the loss of antimicrobial properties is substantially reduced resulting in a longer shelf life and a higher quality product. Also, the skin layer has been found to reduce the access of oxygen thereby slowing the loss of ascorbic acid.

In addition, the present barrier laminate, by use of the heat seal layer, provides heat seal bonds that define the structure of the carton and provide liquid tight and gas tight closures. Thus, as already noted, the present barrier laminate provides all the desired properties for a paperboard type beverage carton.

COMPARATIVE TESTS

In order to determine the effect of different skin layers of laminates on the retention of ascorbic acid and D-limonene in orange juice, a series of tests were carried out. Cartons in accordance with the laminate of the first embodiment of the present invention were prepared differing only in their innermost or skin layer, the layer which in use would contact the juice contents. Cartons corresponding to the conventional or regular polyethylene carton were also prepared, and were considered the control cartons.

The conventional test methods for carrying out the studies and the analytical procedures were used.

Orange Juice, filled at an operational juice plant, was packaged and stored in the following half gallon cartons for eight (8) weeks:

1. Regular PE
2. Invention/EVOH
3. Invention/POLYAMIDE (NYLON)
4. Invention/PET

All cartons were filled with orange juice, sealed, refrigerated and then tested for the retention of D-limonene and ascorbic acid in the juice over an eight week period by standard AOAC methods in the same manner as in U.S. Pat. No. 4,777,088.

Results and Discussion:

The results discussed below are confined mainly to the first six weeks. After that time, the presence of mold and other microbial growth would be a factor influencing the continued degradation of orange juice. Mold was observed Following week 6, the effect of microbial growth in the juice may have contributed to the decrease in ascorbic acid retention.

The average data from the chemical analysis is presented below:

TABLE 1

% D-LIMONENE RETENTION

| SAMPLE | WEEK | | | | | | | | |
|---|---|---|---|---|---|---|---|---|---|
| | 0 | 1 | 2 | 3 | 4 | 5 | 6 | 7 | 8 |
| PE | 100.0 | 91.18 | 77.65 | 73.53 | 68.24 | 60.35 | 57.65 | 47.05 | 49.76 |
| EVOH | 100.0 | 100.00 | 100.00 | 100.00 | 100.00 | 100.00 | 100.00 | 100.00 | 100.00 |
| NYLON | 100.0 | 96.67 | 91.11 | 92.22 | 92.78 | 93.33 | 93.33 | 86.67 | 86.22 |
| PET | 100.0 | 100.00 | 100.00 | 100.00 | 100.00 | 100.00 | 100.00 | 100.00 | 100.00 |

TABLE 1

% ASCORBIC ACID RETENTION

| SAMPLE | WEEK | | | | | | | | |
|---|---|---|---|---|---|---|---|---|---|
| | 0 | 1 | 2 | 3 | 4 | 5 | 6 | 7 | 8 |
| PE | 100.0 | 86.67 | 75.35 | 62.35 | 53.13 | 40.92 | 24.77 | 10.77 | 7.96 |
| EVOH | 100.0 | 93.52 | 88.95 | 89.40 | 81.21 | 80.00 | 78.92 | 71.31 | 71.50 |
| NYLON | 100.0 | 93.76 | 87.56 | 88.37 | 80.02 | 80.97 | 77.77 | 69.67 | 70.46 |
| PET | 100.0 | 92.17 | 85.77 | 84.97 | 77.51 | 76.61 | 70.18 | 63.33 | 52.98 | after six weeks, much of the observed mold being located on carton seams where oxygen would have encouraged growth. Microbial growth was likely to have been present several days before physical observation thereof.

D-LIMONENE

Invention/PET and Invention/EVOH:

The orange juice contained in these cartons retained close to 100% of D-limonene, which is characteristic of these non-scalping polymers.

Invention/POLYAMIDE (NYLON):

The orange juice contained in these cartons lost about 8–9% D-limonene by week 2, after which time it seemed to stabilize at about 91% retention.

Regular PE:

The orange juice in the regular PE cartons continued a downward loss of D-limonene. At week 6, retention was less than 60%.

ASCORBIC ACID

Invention/EVOH and Invention/POLYAMIDE (NYLON):

The orange juice in these cartons showed similar trends in the loss of ascorbic acid. By week 6, both of these cartons had maintained approximately 78% retention.

Invention/PET:

These cartons showed a slightly lower percent retention than the other structures. At week 6, ascorbic acid retention was 70%. It was observed that the PET carton had poor side, top and bottom seams, which may have allowed for greater oxidation of ascorbic acid.

Regular PE:

Orange juice in the regular PE carton showed a continued drop in ascorbic acid retention weekly. At week 6, the ascorbic acid retention was only 25%.

As shown in the results set forth in Table 1, orange juice packaged in EVOH and PET skin coated cartons retained 100% of the D-limonene content through week 8. The regular polyethylene juice carton was shown to be an inferior structure for retention of D-limonene. As shown in results set forth in Table 2, the orange juice packaged in EVOH, PET and POLYAMIDE (NYLON) cartons retained approximately 75% of its ascorbic acid content through week six and the regular polyethylene juice carton was also shown to be an inferior structure for retention of ascorbic acid.

Summary:

Orange juice contained in various skin coated cartons was chemically analyzed for retention of ascorbic acid and D-limonene over an eight week period. Orange juice packaged in cartons in accordance with the first embodiment of the present invention retained approximately 75% of its ascorbic acid content through week six. Orange juice packaged in EVOH and PET skin coat cartons retained 100% of the D-limonene content through week 8. The regular polyethylene juice carton was shown to be an inferior structure for retention of either ascorbic acid or D-limonene.

Laboratory tests were made to illustrate the effect of pure D-limonene on microbial counts. In a first approach, juice from a single lot of concentrate was made to different oil contents. The range covered the legal grade A limits for orange juice (0.011 to 0.035%). The juices were held at 4 degrees C. in hydrogen peroxide sterilized gable top cartons with LDPE skin coats. Plate counts were taken biweekly for the first two weeks and weekly thereafter. The effect of peel oil on microbial numbers was studied, and peel oil and ascorbic acid were monitored. This approach examined the container/microbiological relationship under actual conditions of container use.

In the second approach, LDPE strips were added to the juices held in nitrogen-purged glass vessels. Identically treated juice without a LDPE sheet served as the control. The juices were monitored microbially as described above, and peel oil and ascorbic acid were also monitored. This approach removed potential deviations dictated by variable oxygen permeabilities.

The results of microbial growth versus percent D-limonene in OSA plates (average count) are set forth in the following result in Table III, and the results of microbial growth versus percent D-limonene in APDA plates (average count) are set forth in Table IV. Also, the results of the microbial growth versus percent peel oil in OSA plates (average count) and in APDA plates (average count) are set forth in the following Tables V and VI, respectively.

TABLE III

THE EFFECT OF PURE LIMONENE ON MICROBIAL COUNTS

| DATE PLATED | TIME IN DAYS | SAMPLE COUNTS OSA | LOG | DUPLICATE COUNTS OSA | LOG | AVE. LOG CFU | +/− SD |
|---|---|---|---|---|---|---|---|
| RUN NUMBER 2 OIL LEVEL .001 (CONTROL) | | | | INCUBATION TEMPERATURE 40 DEGREES F. DATE PUT INTO STORAGE 6/25/91 | | | |
| 6/25 | 0 | $22.00 \times 10^{-1}$* | 2.34 | $20.00 \times 10^{-1}$* | 2.30 | | |
| | | $21.00 \times 10^{-1}$* | 2.32 | $22.00 \times 10^{-1}$* | 2.34 | 2.33 | / 0.019 |
| 6/26 | 1 | $16.00 \times 10^{-1}$* | 2.20 | $23.00 \times 10^{-1}$* | 2.36 | 2.28 | / 0.113 |
| 6/27 | 2 | $36.00 \times 10^{-1}$ | 2.56 | $28.00 \times 10^{-1}$ | 2.45 | | |
| | | $26.00 \times 10^{-1}$ | 2.41 | $24.00 \times 10^{-1}$* | 2.38 | 2.45 | / 0.079 |
| 6/28 | 3 | $41.00 \times 10^{-1}$ | 2.61 | $56.00 \times 10^{-1}$ | 2.75 | | |
| | | $57.00 \times 10^{-1}$ | 2.76 | $61.00 \times 10^{-1}$ | 2.79 | 2.73 | / 0.080 |
| 7/3 | 8 | $10.70 \times 10^{-3}$ | 4.03 | $6.60 \times 10^{-3}$ | 3.82 | | |
| | | $11.50 \times 10^{-3}$ | 4.06 | $9.80 \times 10^{-3}$ | 3.99 | 3.98 | / 0.107 |
| 7/8 | 13 | $9.40 \times 10^{-4}$ | 4.97 | $11.70 \times 10^{-4}$ | 5.07 | | |
| | | $8.50 \times 10^{-4}$ | 4.93 | $13.90 \times 10^{-4}$ | 5.14 | 5.03 | / 0.095 |
| 7/11 | 16 | $2.91 \times 10^{-5}$@ | 5.46 | $2.38 \times 10^{-5}$ | 5.38 | | |
| | | $1.90 \times 10^{-5}$ | 5.28 | $2.40 \times 10^{-5}$ | 5.38 | | |
| | | $2.00 \times 10^{-5}$* | 5.30 | $3.30 \times 10^{-5}$ | 5.52 | | |
| | | $2.00 \times 10^{-5}$* | 5.30 | $3.20 \times 10^{-5}$ | 5.51 | 5.39 | / 0.096 |
| 7/19 | 24 | $5.80 \times 10^{-5}$ | 5.76 | $4.80 \times 10^{-5}$ | 5.68 | | |
| | | $5.50 \times 10^{-5}$ | 5.74 | $5.90 \times 10^{-5}$ | 5.77 | 5.74 | / 0.040 |
| RUN NUMBER 2 OIL LEVEL .003 | | | | INCUBATION TEMPERATURE 40 DEGREES F. DATE PUT INTO STORAGE 6/25/91 | | | |
| 6/25 | 0 | $31.00 \times 10^{-1}$ | 2.49 | $25.00 \times 10^{-1}$ | 2.40 | 2.45 | / 0.064 |
| 6/26 | 1 | $27.00 \times 10^{-1}$ | 2.43 | $14.00 \times 10^{-1}$* | 2.15 | | |
| | | $25.00 \times 10^{-1}$ | 2.40 | $31.00 \times 10^{-1}$ | 2.49 | 2.37 | / 0.150 |
| 6/27 | 2 | $38.00 \times 10^{-1}$ | 2.58 | $29.00 \times 10^{-1}$ | 2.46 | 2.41 | / 0.137 |
| | | $21.00 \times 10^{-1}$* | 2.32 | $19.00 \times 10^{-1}$* | 2.28 | | |
| 6/28 | 3 | $45.00 \times 10^{-1}$ | 2.65 | $66.00 \times 10^{-1}$ | 2.82 | | |
| | | $62.00 \times 10^{-1}$ | 2.79 | $45.00 \times 10^{-1}$ | 2.65 | 2.73 | / 0.090 |
| 7/3 | 8 | $6.10 \times 10^{-3}$ | 3.79 | $4.30 \times 10^{-3}$ | 3.63 | | |
| | | $7.40 \times 10^{-3}$ | 3.87 | $4.40 \times 10^{-3}$ | 3.64 | 3.73 | / 0.117 |
| 7/8 | 13 | $4.50 \times 10^{-4}$ | 4.65 | # | | | |
| | | $5.60 \times 10^{-4}$ | 4.75 | # | | | |
| | | $5.15 \times 10^{-4}$ | 4.71 | # | | | |
| | | $5.18 \times 10^{-4}$ | 4.71 | # | | 4.71 | / 0.041 |
| 7/11 | 16 | $2.12 \times 10^{-5}$ | 5.33 | $1.72 \times 10^{-5}$ | 5.24 | | |
| | | $2.11 \times 10^{-5}$ | 5.32 | $1.64 \times 10^{-5}$ | 5.21 | | |
| | | $2.20 \times 10^{-5}$* | 5.34 | $2.20 \times 10^{-5}$* | 5.34 | | |
| | | $2.40 \times 10^{-5}$* | 5.38 | $2.00 \times 10^{-5}$* | 5.30 | 5.31 | / 0.056 |
| 7/19 | 24 | $5.30 \times 10^{-5}$ | 5.72 | $4.00 \times 10^{-5}$ | 5.60 | | |
| | | $4.90 \times 10^{-5}$ | 5.69 | $5.10 \times 10^{-5}$ | 5.71 | 5.68 | / 0.055 |
| RUN NUMBER 2 OIL LEVEL .008 | | | | INCUBATION TEMPERATURE 40 DEGREES F. DATE PUT INTO STORAGE 6/25/91 | | | |
| 6/25 | 0 | $24.00 \times 10^{-1}$* | 2.38 | # | 2.38 | | |
| 6/26 | 1 | $22.00 \times 10^{-1}$* | 2.34 | $22.00 \times 10^{-1}$* | 2.34 | | |
| | | $20.00 \times 10^{-1}$* | 2.30 | $24.00 \times 10^{-1}$* | 2.38 | 2.34 | / 0.033 |
| 6/27 | 2 | $29.00 \times 10^{-1}$ | 2.46 | $30.00 \times 10^{-1}$ | 2.48 | | |
| | | $19.00 \times 10^{-1}$* | 2.28 | $22.00 \times 10^{-1}$* | 2.34 | 2.39 | / 0.096 |
| 6/28 | 3 | $73.00 \times 10^{-1}$ | 2.86 | $48.00 \times 10^{-1}$ | 2.68 | | |
| | | $29.00 \times 10^{-1}$ | 2.46 | $29.00 \times 10^{-1}$ | 2.46 | 2.62 | / 0.193 |
| 7/3 | 8 | $2.64 \times 10^{-3}$@ | 3.42 | $1.85 \times 10^{-3}$ | 3.27 | | |
| | | $2.44 \times 10^{-3}$ | 3.39 | $1.51 \times 10^{-3}$ | 3.18 | | |
| | | $1.80 \times 10^{-3}$* | 3.26 | $1.40 \times 10^{-3}$* | 3.15 | | |
| | | $2.20 \times 10^{-3}$* | 3.34 | $1.40 \times 10^{-3}$* | 3.15 | 3.27 | / 0.106 |
| 7/8 | 13 | $0.92 \times 10^{-4}$ | 3.96 | $1.40 \times 10^{-4}$ | 4.15 | | |
| | | $0.82 \times 10^{-4}$ | 3.91 | $1.63 \times 10^{-4}$ | 4.21 | 4.06 | / 0.145 |

TABLE III-continued

THE EFFECT OF PURE LIMONENE ON MICROBIAL COUNTS

| DATE PLATED | TIME IN DAYS | SAMPLE COUNTS OSA | LOG | DUPLICATE COUNTS OSA | LOG | AVE. LOG CFU | +/− SD |
|---|---|---|---|---|---|---|---|
| 7/11 | 16 | $1.53 \times 10^{-4}$ | 4.18 | $4.14 \times 10^{-4}$@ | 4.62 | | |
| | | $1.85 \times 10^{-4}$ | 4.27 | $3.25 \times 10^{-4}$@ | 4.51 | | |
| | | $1.50 \times 10^{-4}$* | 4.18 | $4.70 \times 10^{-4}$ | 4.67 | | |
| | | $1.70 \times 10^{-4}$* | 4.23 | $3.90 \times 10^{-4}$ | 4.59 | 4.41 | / 0.211 |
| 7/19 | 24 | $1.67 \times 10^{-5}$ | 5.22 | $1.17 \times 10^{-5}$ | 5.07 | | |
| | | $1.75 \times 10^{-5}$ | 5.24 | $1.19 \times 10^{-5}$ | 5.08 | 5.15 | / 0.090 |

RUN NUMBER 2  
OIL LEVEL .0158  
INCUBATION TEMPERATURE 40 DEGREES F.  
DATE PUT INTO STORAGE 6/25/91

| DATE PLATED | TIME IN DAYS | SAMPLE COUNTS OSA | LOG | DUPLICATE COUNTS OSA | LOG | AVE. LOG CFU | +/− SD |
|---|---|---|---|---|---|---|---|
| 6/25 | 0 | $17.00 \times 10^{-1}$* | 2.23 | $14.00 \times 10^{-1}$* | 2.15 | 2.19 | / 0.057 |
| 6/26 | 1 | $29.00 \times 10^{-1}$ | 2.46 | $16.00 \times 10^{-1}$* | 2.04 | | |
| | | $21.00 \times 10^{-1}$* | 2.32 | $7.00 \times 10^{-1}$* | 1.85 | 2.17 | / 0.274 |
| 6/27 | 2 | $20.00 \times 10^{-1}$* | 2.30 | $19.00 \times 10^{-1}$* | 2.28 | | |
| | | $25.00 \times 10^{-1}$ | 2.40 | $26.00 \times 10^{-1}$ | 2.41 | 2.35 | / 0.067 |
| 6/28 | 3 | $27.00 \times 10^{-1}$ | 2.43 | $45.00 \times 10^{-1}$ | 2.65 | | |
| | | $22.00 \times 10^{-1}$* | 2.34 | $31.00 \times 10^{-1}$ | 2.49 | 2.48 | / 0.130 |
| 7/3 | 8 | $0.51 \times 10^{-3}$ | 2.71 | $0.32 \times 10^{-3}$ | 2.51 | | |
| | | $0.39 \times 10^{-3}$ | 2.59 | $0.38 \times 10^{-3}$ | 2.58 | 2.60 | / 0.083 |
| 7/8 | 13 | $1.48 \times 10^{-3}$ | 3.17 | $1.03 \times 10^{-3}$ | 3.01 | | |
| | | $1.79 \times 10^{-3}$ | 3.25 | $1.42 \times 10^{-3}$ | 3.15 | 3.15 | / 0.100 |
| 7/11 | 16 | $6.20 \times 10^{-2}$ | 2.79 | $11.30 \times 10^{-2}$ | 3.05 | | |
| | | $5.40 \times 10^{-2}$ | 2.73 | $11.40 \times 10^{-2}$ | 3.06 | 2.91 | / 0.172 |
| 7/19 | 24 | $1.62 \times 10^{-3}$ | 3.21 | $1.67 \times 10^{-3}$ | 3.22 | | |
| | | $1.72 \times 10^{-3}$ | 3.24 | $1.76 \times 10^{-3}$ | 3.25 | 3.23 | / 0.018 |

RUN NUMBER 2  
OIL LEVEL .018  
INCUBATION TEMPERATURE 40 DEGREES F.  
DATE PUT INTO STORAGE 6/25/91

| DATE PLATED | TIME IN DAYS | SAMPLE COUNTS OSA | LOG | DUPLICATE COUNTS OSA | LOG | AVE. LOG CFU | +/− SD |
|---|---|---|---|---|---|---|---|
| 6/25 | 0 | $26.00 \times 10^{-1}$ | 2.42 | $18.00 \times 10^{-1}$* | 2.26 | 2.34 | / 0.113 |
| 6/26 | 1 | $20.00 \times 10^{-1}$* | 2.30 | $17.00 \times 10^{-1}$* | 2.23 | | |
| | | $24.00 \times 10^{-1}$* | 2.38 | $22.00 \times 10^{-1}$* | 2.34 | 2.31 | / 0.064 |
| 6/27 | 2 | $16.00 \times 10^{-1}$* | 2.20 | $24.00 \times 10^{-1}$* | 2.38 | | |
| | | $23.00 \times 10^{-1}$* | 2.36 | $34.00 \times 10^{-1}$ | 2.53 | 2.37 | / 0.135 |
| 6/28 | 3 | $18.00 \times 10^{-1}$* | 2.26 | $18.00 \times 10^{-1}$* | 2.26 | | |
| | | $13.00 \times 10^{-1}$* | 2.11 | $22.00 \times 10^{-1}$* | 2.34 | 2.24 | / 0.096 |
| 7/3 | 8 | $0.22 \times 10^{-3}$* | 2.34 | $0.21 \times 10^{-3}$* | 2.32 | | |
| | | $0.26 \times 10^{-3}$ | 2.41 | $0.24 \times 10^{-3}$* | 2.38 | 2.36 | / 0.040 |
| 7/8 | 13 | $0.47 \times 10^{-3}$ | 2.67 | $0.98 \times 10^{-3}$ | 2.99 | | |
| | | $0.55 \times 10^{-3}$ | 2.74 | $0.89 \times 10^{-3}$ | 2.95 | 2.84 | / 0.156 |
| 7/11 | 16 | $5.50 \times 10^{-2}$ | 2.74 | $5.10 \times 10^{-2}$ | 2.71 | | |
| | | $3.80 \times 10^{-2}$ | 2.58 | $4.40 \times 10^{-2}$ | 2.64 | 2.67 | / 0.072 |
| 7/19 | 24 | $6.90 \times 10^{-2}$ | 2.84 | $12.60 \times 10^{-2}$ | 3.10 | | |
| | | $6.80 \times 10^{-2}$ | 2.83 | $9.40 \times 10^{-2}$ | 2.97 | | |
| | | $6.70 \times 10^{-2}$ | 2.83 | $10.60 \times 10^{-2}$ | 3.03 | 2.93 | / 0.117 |

RUN NUMBER 2  
OIL LEVEL .033  
INCUBATION TEMPERATURE 40 DEGREES F.  
DATE PUT INTO STORAGE 6/25/91

| DATE PLATED | TIME IN DAYS | SAMPLE COUNTS OSA | LOG | DUPLICATE COUNTS OSA | LOG | AVE. LOG CFU | +/− SD |
|---|---|---|---|---|---|---|---|
| 6/25 | 0 | $17.00 \times 10^{-1}$* | 2.23 | $22.00 \times 10^{-1}$* | 2.34 | 2.29 | / 0.778 |
| 6/26 | 1 | $9.00 \times 10^{-1}$* | 1.95 | $20.00 \times 10^{-1}$* | 2.30 | | |
| | | $18.00 \times 10^{-1}$* | 2.26 | $15.00 \times 10^{-1}$* | 2.18 | 2.17 | / 0.156 |
| 6/27 | 2 | $12.00 \times 10^{-1}$* | 2.08 | $15.00 \times 10^{-1}$* | 2.18 | | |
| | | $15.00 \times 10^{-1}$* | 2.18 | $14.00 \times 10^{-1}$* | 2.15 | 2.15 | / 0.047 |
| 6/28 | 3 | $22.00 \times 10^{-1}$* | 2.34 | $14.00 \times 10^{-1}$* | 2.15 | | |
| | | $16.00 \times 10^{-1}$* | 2.20 | $9.00 \times 10^{-1}$* | 1.95 | 2.16 | / 0.161 |
| 7/3 | 8 | $0.09 \times 10^{-3}$* | 1.95 | $0.13 \times 10^{-3}$* | 2.11 | | |
| | | $0.10 \times 10^{-3}$* | 2.00 | $0.19 \times 10^{-3}$* | 2.28 | 2.09 | / 0.146 |
| 7/8 | 13 | $0.20 \times 10^{-3}$* | 2.30 | $0.18 \times 10^{-3}$* | 2.26 | | |
| | | $0.18 \times 10^{-3}$* | 2.26 | $0.26 \times 10^{-3}$ | 2.41 | 2.31 | / 0.071 |
| 7/11 | 16 | # | | $1.40 \times 10^{-2}$* | 2.15 | | |
| | | # | | $2.00 \times 10^{-2}$* | 2.30 | 2.23 | / 0.106 |
| 7/19 | 24 | $10.00 \times 10^{-1}$* | 2.00 | $8.00 \times 10^{-1}$* | 1.90 | | |
| | | $11.00 \times 10^{-1}$* | 2.04 | $7.00 \times 10^{-1}$* | 1.85 | | |
| | | $12.00 \times 10^{-1}$* | 2.08 | $11.00 \times 10^{-1}$* | 2.04 | 1.99 | / 0.090 |

The plate was either too smeared to count or too contaminated with mold to count.  
*The actual total colony count on a plate was less than 25 and is therefore considered an estimate.  
@The actual total colony count on a plate was greater than 250 and is therefore considered an estimate.

TABLE IV

THE EFFECT OF PURE LIMONENE ON MICROBIAL COUNTS

| RUN NUMBER 2 OIL LEVEL .001 (CONTROL) | | | | INCUBATION TEMPERATURE 40 DEGREES F DATE PUT INTO STORAGE 6/25/91 | | |
|---|---|---|---|---|---|---|
| DATE PLATED | TIME IN DAYS | SAMPLE COUNTS APDA | LOG | DUPLICATE COUNTS APDA | LOG | AVE. LOG CFU +/− SD |
| 6/25 | 0 | 13.00 × 10−1* | 2.11 | 7.00 × 10−1* | 1.85 | 1.98/0.184 |
| 6/26 | 1 | 15.00 × 10−1* | 2.18 | 15.00 × 10−1* | 2.18 | |
| | | 11.00 × 10−1* | 2.04 | 14.00 × 10−1* | 2.15 | 2.14/0.067 |
| 6/27 | 2 | 35.00 × 10−1 | 2.54 | 24.00 × 10−1* | 2.38 | |
| | | 22.00 × 10−1* | 2.34 | 24.00 × 10−1* | 2.38 | 2.41/0.089 |
| 6/28 | 3 | 45.00 × 10−1 | 2.65 | 40.00 × 10−1 | 2.60 | |
| | | 53.00 × 10−1 | 2.72 | 46.00 × 10−1 | 2.66 | 2.66/0.049 |
| 7/3 | 8 | 11.00 × 10−3 | 4.04 | 7.80 × 10−3 | 3.89 | |
| | | 11.40 × 10−3 | 4.06 | 8.80 × 10−3 | 3.94 | 3.98/0.081 |
| 7/8 | 13 | 8.65 × 10−4@ | 4.94 | # | | |
| | | 8.16 × 10−4@ | 4.91 | # | | |
| | | 10.20 × 10−4 | 5.01 | # | | |
| | | 9.50 × 10−4 | 4.98 | # | | 4.96/0.044 |
| 7/11 | 16 | 2.11 × 10−5 | 5.32 | 2.86 × 10−5@ | 5.46 | |
| | | 2.15 × 10−5 | 5.33 | 2.40 × 10−5 | 5.38 | |
| | | 2.50 × 10−5 | 5.40 | # | | |
| | | 2.30 × 10−5* | 5.36 | 2.30 × 10−5* | 5.36 | 5.37/0.047 |
| 7/19 | 24 | 6.40 × 10−5 | 5.81 | 5.50 × 10−5 | 5.74 | |
| | | 6.00 × 10−5 | 5.78 | 6.50 × 10−5 | 5.81 | 5.79/0.033 |

The plate was either too smeared to read or too contaminated by mold to count.
*The actual total colony count on a plate was less than 25 and is therefore considered an estimate.
@The actual total colony count on a plate was greater than 250 and is therefore considered an estimate.

| RUN NUMBER 2 OIL LEVEL .003 | | | | INCUBATION TEMPERATURE 40 DEGREES F DATE PUT INTO STORAGE 6/25/91 | | |
|---|---|---|---|---|---|---|
| DATE PLATED | TIME IN DAYS | SAMPLE COUNTS APDA | LOG | DUPLICATE COUNTS APDA | LOG | AVE. LOG CFU +/− SD |
| 6/25 | 0 | 8.00 × 10−1* | 1.90 | 12.00 × 10−1* | 2.08 | 1.99/0.127 |
| 6/26 | 1 | 17.00 × 10−1* | 2.23 | 13.00 × 10−1* | 2.11 | |
| | | 18.00 × 10−1* | 2.26 | 13.00 × 10−1* | 2.11 | 2.18/0.079 |
| 6/27 | 2 | 24.00 × 10−1* | 2.38 | 20.00 × 10−1* | 2.30 | |
| | | 22.00 × 10−1* | 2.34 | 15.00 × 10−1* | 2.18 | 2.30/0.086 |
| 6/28 | 3 | 39.00 × 10−1 | 2.59 | 40.00 × 10−1 | 2.60 | |
| | | 38.00 × 10−1 | 2.58 | 41.00 × 10−1 | 2.61 | 2.60/0.013 |
| 7/5 | 8 | 5.00 × 10−3 | 3.70 | 3.20 × 10−3 | 3.51 | |
| | | 8.30 × 10−3 | 3.92 | 4.00 × 10−3 | 3.60 | |
| | | 5.58 × 10−3@ | 3.75 | 4.06 × 10−3@ | 3.61 | |
| | | 5.50 × 10−3@ | 3.74 | 4.18 × 10−3@ | 3.62 | 3.68/0.126 |
| 7/8 | 13 | 5.80 × 10−4 | 4.76 | # | | |
| | | 4.50 × 10−4 | 4.65 | # | | |
| | | 5.30 × 10−4@ | 4.72 | # | | |
| | | 5.49 × 10−4@ | 4.74 | # | | 4.72/0.048 |
| 7/11 | 16 | 5.49 × 10−5@ | 5.74 | 1.76 × 10−5 | 5.25 | |
| | | 4.90 × 10−5 | 5.69 | 1.74 × 10−5 | 5.24 | |
| | | 6.10 × 10−5 | 5.79 | 2.10 × 10−5* | 5.32 | |
| | | | | 2.00 × 10−5* | 5.30 | 5.48/0.250 |
| 7/19 | 24 | 3.80 × 10−5 | 5.58 | 4.60 × 10−5 | 5.66 | |
| | | 4.00 × 10−5 | 5.60 | 5.40 × 10−5 | 5.73 | 5.64/0.068 |

The plate was either too smeared to count or too contaminated with mold to count.
*The actual total colony count on a plate was less than 25 and is therefore considered and estimate.
@The actual total colony count on a plate was greater than 250 and is therefore considered an estimate.

| RUN NUMBER 2 OIL LEVEL .008 | | | | INCUBATION TEMPERATURE 40 DEGREES F DATE PUT INTO STORAGE 6/25/91 | | |
|---|---|---|---|---|---|---|
| DATE PLATED | TIME IN DAYS | SAMPLE COUNTS APDA | LOG | DUPLICATE COUNTS APDA | LOG | AVE. LOG CFU +/− SD |
| 6/25 | 0 | 8.00 × 10−1* | 1.90 | 6.00 × 10−1* | 1.78 | |
| | | | | 8.00 × 10−1* | 1.90 | 1.86/0.069 |
| 6/26 | 1 | 8.00 × 10−1* | 1.90 | 10.00 × 10−1* | 2.00 | |
| | | 12.00 × 10−1* | 2.08 | 6.00 × 10−1* | 1.78 | 1.94/0.130 |
| 6/27 | 2 | 13.00 × 10−1* | 2.11 | 22.00 × 10−1* | 2.34 | |
| | | 23.00 × 10−1* | 2.36 | 13.00 × 10−1* | 2.11 | 2.23/0.139 |
| 6/28 | 3 | 23.00 × 10−1* | 2.36 | 25.00 × 10−1 | 2.40 | |
| | | 22.00 × 10−1* | 2.34 | 23.00 × 10−1* | 2.36 | 2.37/0.025 |

TABLE IV-continued

THE EFFECT OF PURE LIMONENE ON MICROBIAL COUNTS

| 7/3 | 8 | $2.23 \times 10{-3}$ | 3.35 | $1.76 \times 10{-3}$ | 3.25 | |
| --- | --- | --- | --- | --- | --- | --- |
| | | $2.20 \times 10{-3}$ | 3.34 | $1.53 \times 10{-3}$ | 3.18 | |
| | | $2.60 \times 10{-3}$ | 3.41 | $3.20 \times 10{-3}$ | 3.51 | |
| | | $1.20 \times 10{-3}*$ | 3.08 | $1.40 \times 10{-3}*$ | 3.15 | 3.28/0.144 |
| 7/8 | 13 | $1.00 \times 10{-4}$ | 4.00 | $1.56 \times 10{-4}$ | 4.19 | |
| | | $0.90 \times 10{-4}$ | 3.95 | $1.64 \times 10{-4}$ | 4.21 | 4.09/0.132 |
| 7/11 | 16 | $1.73 \times 10{-4}$ | 4.24 | $86.00 \times 10{-4}$ | 5.93 | |
| | | $1.97 \times 19{-4}$ | 4.29 | $82.00 \times 10{-4}$ | 5.91 | 5.09/0.956 |
| 7/19 | 24 | $1.44 \times 10{-5}$ | 5.16 | $1.68 \times 10{-5}$ | 5.23 | |
| | | $1.71 \times 10{-5}$ | 5.23 | $1.55 \times 10{-5}$ | 5.19 | 5.20/0.034 |

\# The plate was either too smeared to count or too contaminated by mold to count.
*The actual total colony count on a plate was less than 25 and is therefore considered and estimate.
@The actual total colony count on a plate was greater than 250 and is therefore considered and estimate.

RUN NUMBER 2      INCUBATION TEMPERATURE 40 DEGREES F
OIL LEVEL .0158      DATE PUT INTO STORAGE 6/25/91

| DATE PLATED | TIME IN DAYS | SAMPLE COUNTS APDA | LOG | DUPLICATE COUNTS APDA | LOG | AVE. LOG CFU +/- SD |
| --- | --- | --- | --- | --- | --- | --- |
| 6/25 | 0 | $5.00 \times 10{-1}*$ | 1.70 | $10.00 \times 10{-1}*$ | 2.00 | |
| | | $8.00 \times 10{-1}*$ | 1.90 | | | 1.87/0.153 |
| 6/26 | 1 | $17.00 \times 10{-1}*$ | 2.23 | $13.00 \times 10{-1}*$ | 2.11 | |
| | | $12.00 \times 10{-1}*$ | 2.08 | $11.00 \times 10{-1}*$ | 2.04 | 2.12/0.082 |
| 6/27 | 2 | $8.00 \times 10{-1}*$ | 1.90 | $9.00 \times 10{-1}*$ | 1.95 | |
| | | $7.00 \times 10{-1}*$ | 1.85 | $12.00 \times 10{-1}*$ | 2.08 | 1.95/0.099 |
| 6/28 | 3 | $15.00 \times 10{-1}*$ | 2.18 | $16.00 \times 10{-1}*$ | 2.20 | |
| | | $16.00 \times 10{-1}*$ | 2.20 | $11.00 \times 10{-1}*$ | 2.04 | 2.16/0.077 |
| 7/3 | 8 | $0.46 \times 10{-3}$ | 2.66 | $0.20 \times 10{-3}*$ | 2.30 | |
| | | $0.50 \times 10{-3}$ | 2.70 | $0.31 \times 10{-3}$ | 2.49 | 2.54/0.183 |
| 7/8 | 13 | $1.13 \times 10{-3}$ | 3.05 | $0.97 \times 10{-3}$ | 2.99 | |
| | | $1.50 \times 10{-3}$ | 3.18 | $0.87 \times 10{-3}$ | 2.94 | 3.04/0.104 |
| 7/11 | 16 | $5.30 \times 10{-2}$ | 2.72 | $8.70 \times 10{-2}$ | 2.94 | |
| | | $5.20 \times 10{-2}$ | 2.72 | $10.40 \times 10{-2}$ | 3.02 | 2.85/0.154 |
| 7/19 | 24 | $1.25 \times 10{-3}$ | 3.10 | $1.10 \times 10{-3}$ | 3.04 | |
| | | $1.36 \times 10{-3}$ | 3.13 | $1.17 \times 10{-3}$ | 3.07 | 3.09/0.039 |

\# The plate was either too smeared to count or too contaminated by mold to count.
*The actual total colony count on a plate was less than 25 and is therefore considered an estimate.
@The actual total colony count on a plate was greater than 250 and is therefore considered an estimate.

RUN NUMBER 2      INCUBATION TEMPERATURE 40 DEGREES F
OIL LEVEL .018      DATE PUT INTO STORAGE 6/25/91

| DATE PLATED | TIME IN DAYS | SAMPLE COUNTS APDA | LOG | DUPLICATE COUNTS APDA | LOG | AVE. LOG CFU +/- SD |
| --- | --- | --- | --- | --- | --- | --- |
| 6/25 | 0 | $11.00 \times 10{-1}*$ | 2.04 | $12.00 \times 10{-1}*$ | 2.08 | |
| | | $10.00 \times 10{-1}*$ | 2.00 | $6.00 \times 10{-1}*$ | 1.78 | 1.98/0.134 |
| 6/26 | 1 | $13.00 \times 10{-1}*$ | 2.11 | $8.00 \times 10{-1}*$ | 1.90 | |
| | | $15.00 \times 10{-1}*$ | 2.18 | $11.00 \times 10{-1}*$ | 2.04 | 2.06/0.120 |
| 6/27 | 2 | $13.00 \times 10{-1}*$ | 2.11 | $14.00 \times 10{-1}*$ | 2.15 | |
| | | $11.00 \times 10{-1}*$ | 2.04 | $18.00 \times 10{-1}*$ | 2.26 | 2.14/0.092 |
| 6/28 | 3 | $14.00 \times 10{-}*$ | 2.15 | $10.00 \times 10{-1}*$ | 2.00 | |
| | | $10.00 \times 10{-1}*$ | 2.00 | $18.00 \times 10{-1}*$ | 2.26 | 2.10/0.127 |
| 7/3 | 8 | $0.33 \times 10{-3}$ | 2.52 | $0.25 \times 10{-3}$ | 2.40 | |
| | | $0.22 \times 10{-3}*$ | 2.34 | $0.18 \times 10{-3}*$ | 2.26 | 2.38/0.110 |
| 7/8 | 13 | $0.55 \times 10{-3}$ | 2.74 | \# | | |
| | | $0.60 \times 10{-3}$ | 2.78 | \# | | 2.76/0.028 |
| 7/11 | 16 | $3.90 \times 10{-2}$ | 2.59 | $4.20 \times 10{-2}$ | 2.62 | |
| | | $3.60 \times 10{-2}$ | 2.56 | $3.50 \times 10{-2}$ | 2.54 | 2.58/0.035 |
| 7/19 | 24 | $5.20 \times 10{-2}$ | 2.72 | $5.20 \times 10{-2}$ | 2.72 | |
| | | $4.20 \times 10{-2}$ | 2.62 | $4.10 \times 10{-2}$ | 2.61 | |
| | | $4.50 \times 10{-2}$ | 2.65 | $5.70 \times 10{-2}$ | 2.76 | 2.68/0.062 |

\# The plate was either too smeared to count or too contaminated by mold to count.
*The actual total colony count on a plate was less than 25 and is therefore considered an estimate.
@The actual total colony count on a plate was greater than 250 and is therefore considered an estimate.

RUN NUMBER 2      INCUBATION TEMPERATURE 40 DEGREES F
OIL LEVEL .033      DATE PUT INTO STORAGE 6/25/91

| DATE PLATED | TIME IN DAYS | SAMPLE COUNTS APDA | LOG | DUPLICATE COUNTS APDA | LOG | AVE. LOG CFU +/- SD |
| --- | --- | --- | --- | --- | --- | --- |
| 6/25 | 0 | $18.00 \times 10{-1}*$ | 2.26 | $5.00 \times 10{-1}*$ | 1.70 | |

TABLE IV-continued

THE EFFECT OF PURE LIMONENE ON MICROBIAL COUNTS

|      |    |                    |      |                    |      |             |
|------|----|--------------------|------|--------------------|------|-------------|
|      |    | 4.00 × 10–1*       | 1.60 | 10.00 × 10–1*      | 2.00 | 1.89/0.300  |
| 6/26 | 1  | 11.00 × 10–1*      | 2.04 | 4.00 × 10–1*       | 1.60 |             |
|      |    | 8.00 × 10–1*       | 1.90 | 7.00 × 10–1*       | 1.85 | 1.85/0.184  |
| 6/27 | 2  | 9.00 × 10–1*       | 1.95 | 12.00 × 10–1*      | 2.08 |             |
|      |    | 9.00 × 10–1*       | 1.95 | 8.00 × 10–1*       | 1.90 | 1.97/0.077  |
| 6/28 | 3  | 14.00 × 10–1*      | 2.15 | 18.00 × 10–1*      | 2.26 |             |
|      |    | 10.00 × 10–1*      | 2.00 | 12.00 × 10–1*      | 2.08 | 2.12/0.110  |
| 7/3  | 8  | 0.10 × 10–3*       | 2.00 | 0.09 × 10–3*       | 1.95 |             |
|      |    | 0.07 × 10–3*       | 1.85 | 0.07 × 10–3*       | 1.85 | 1.91/0.075  |
| 7/8  | 13 | 0.04 × 10–3*       | 1.60 | 0.46 × 10–3        | 2.66 |             |
|      |    | 0.17 × 10–3*       | 2.23 | 0.23 × 10–3*       | 2.36 | 2.21/0.446  |
| 7/11 | 16 | #                  |      | 1.20 × 10–2*       | 2.08 |             |
|      |    | #                  |      | 1.30 × 10–2*       | 2.11 | 2.10/0.021  |
| 7/19 | 24 | 8.00 × 10–1*       | 1.90 | 1.00 × 10–1*       | 1.00 |             |
|      |    | 6.00 × 10–1*       | 1.78 | 2.00 × 10–1*       | 1.00 |             |
|      |    | 8.00 × 10–1*       | 1.90 | 5.00 × 10–1*       | 1.70 | 1.60/0.367  |

\# The plate was either too smeared to count or too contaminated by mold to count.
*The actual total colony count on a plate is less than 25 and is therefore considered an estimate.
@The actual total colony count on a plate is greater than 250 and is therefore considered an estimate.

The University of Florida's Citrus Research Center conducted four experiments on juices in containers with and without flavor barriers to determine if a high D-limonene count inhibits microbial numbers. The conclusion reached based on the following test results is that all of the oxygen barrier materials listed above, namely, EVOH, polyamide (nylon) and PET, prevent D-limonene absorption and migration.

The first experiment tested the hypothesis that peel oil inhibits microbial number. The procedure followed was: juice homogenized to 72.3 degree Brix (by refractometer) pumpout was made to 0, 0.005, 0.015, 0.025, 0.035 and 0.045% oil. The samples were diluted back to 11.8% Brix, and 5 mL was pipetted into each of twenty 10 mL test tubes with Teflon screw caps. The tubes were held at 4 degrees C., and sampled at 0, 1, 3, 6, 9, 13, 17, 20, 28, 38, 50 days for microbial counts on OSA and ADPA plates. After two days the experiment was aborted due to the lack of viable microorganisms in the tubes to seed the process.

The second experiment repeated the first experiment 1, but with a few minor exceptions. Each essence addition level was spiked with 10 mL unpasteurized, fresh squeezed, homogenized, juice that had been held 4 days at refrigerator temperatures and 1 day (the final day) at room temperature. This was to seed the juice to make certain microorganism were present. The proportions of juice and water were also different. 33 g of concentrate (75 Brix—the same stock used above) received 0., 0.005, 0.015, 0.025, 0.035, or 0.045% additions of peel oil. 160 mL of distilled water were added along with the 10 mL of the juice. Contrary to the previous procedure, oils were run during and directly after essence addition. The three highest values were very similar in Scott oil value. They were also similar in microbial growth. All three levels inhibited microbial growth relative to the control. By the end of the thirty-eight day study, there were approximately 16 times as many organisms in the untreated sample as in the higher D-limonene samples on the ADPA media and 10 times as many organisms in the untreated sample as in the higher D-limonene samples on the OSA media.

The third experiment basically repeated the first two experiments, but with several differences. In previous experiments, essence was added directly to the 72 Brix (normal) citrus concentrate. In the third experiment, concentrate was first diluted to 41.1 Bx. Essence was added to this concentrate once gelled lumps were placed in solution.

A second modification dealt with inoculum type. Experiment 1 did not use an inoculum. Experiment 2 inoculated with fresh juice stored for approximately 3 days. In these experiments, the time required to inoculate all batches was spread out over a couple of hours. Pre-dilution to 41.1 Bx reduced inoculum addition to approximately 30 minutes. A third modification was that D-limonene (not citrus essence) was used. Ultrapure D-limonene replaced the essence used in the first and second experiments.

The following results were achieved: Limonene and Microorganisms: Previous runs had shown that some component of peel oil was a potent inhibitor of microorganism. This experiment showed that D-limonene was at least one of the inhibiting species. Since D-limonene constitutes 95% of cold pressed peel oil, it is likely the major inhibitory entity in juice. The relationship between D-limonene concentration and microbial numbers was overwhelmingly clear. There was over a 7000 fold difference in microorganisms in the 0% D-limonene sample as in the 0.033% D-limonene sample.

The fourth or last experiment proved that D-limonene has a marked inhibitory effect on citrus microorganisms. The purpose of this experiment was to determine whether D-limonene absorption by polymers can translate into microbial differences.

The principal differences in procedure between this fourth experiment and the previous experiments were as follows:

1. 72 Brix concentrate was diluted to approximately 56 Bx.

2. 500 mL glass jars were sterilized. Sanitized samples of LDPE, PET, EVOH and Nylon were added to the bottles. A control bottle without polymer was also sterilized.

3. Each D-limonene concentration (and the 0% D-limonene control) were formulated in batches of 3000 mL. This required 672 g of 56 Brix concentrate and 2464 mL of sterile distilled water. During the first (control) sample too much water was added. The final volume was 3254 mL, not 3136 mL. All other samples were formulated to 3254 g for the sake of consistency.

4. 99.5% pure D-limonene was added directly to the 56 Brix concentrate with an Eppendorf pipetter. D-limonene was dispersed by brisk agitation with a large stainless steel spatula. The concentrate was stirred constantly while water was being added. Mixing was in a nalgeen beaker. Target oil values were 0, 0.015, 0.025, 0.035 and 0.045.

5. 400 mL ±2% of reconstituted juice were added to each 500 mL bottle. The bottles were immediately capped with foil lined screw caps. A 100 mL sample of each D-limonene percent was collected for oil and Brix determination.
6. All bottles were inoculated at the same time several hours later with a mixture consisting of freshly squeezed juice and peel washings.

The following results were achieved: Scalping and microbial numbers—At the 0.0008% D-limonene, there was no significant difference in microbial growth between the control (no polymer) and all the other juice samples containing polymers. This would be expected, since there was no D-limonene to scalp. There would be no scalping differences due to absorption. As the amount of initial D-limonene increased, differences in polymers became much more pronounced. Even at 0.0092% D-limonene, LDPE exhibited greater growth than the control and other polymers. At this level of D-limonene addition, there was not much separation between the PET, EVOH, nylon and the control. At 0.011 and 0.0172% D-limonene, there were ample separations between the polymers. LDPE had the greatest microbial numbers (log CFU=>4) followed by PET (log CFU=3.9), with the blank control next at 3.8 CFU. EVOH was fourth at 3.57 (log CFU) with nylon showing the least growth at 3.44 (log CFU). This represents a 4.5 fold difference between LDPE and nylon. Nylon was consistently the lowest in microbial numbers when there was enough of a difference to be noted. This experiment indicated that D-limonene absorption by the test polymers can translate into microbial differencies.

Based on these tests, it was determined that a thin skin coat layer in a laminate that is impervious to D-limonene inhibits the microorganisms responsible for spoilage in citrus beverages.

While the present invention has been illustrated and described as embodied in a barrier laminate for inhibiting the proliferation of microbial growth and, thus, the migration of D-limonene from the citrus juice in a carton, it is not intended to be limited to the details shown, since various modifications and structural changes may be made without departing in any way from the spirit of the present invention.

We claim:

1. A method for preserving the antimicrobial properties present in a citrus juice that is stored in a paperboard carton formed from a laminate comprised of a plurality of layers having an innermost layer that contacts the juice, the method including the step of preventing the migration of an antimicrobial agent comprising D-limonene present in the juice into the plurality of layers of the carton by making the innermost layer of the carton of a material that is impervious to the antimicrobial agent comprising D-liminone wherein said carton is formed from a barrier laminate comprising:

1. a paperboard substrate having an interior surface and an exterior surface;
2. a heat sealable layer of a heat sealable low density polyethylene coated on said exterior surface of said paperboard substrate;
3. a heat sealable layer of a heat sealable low density polyethylene on the said interior surface of said paperboard substrate;
4. a tie layer of modified low density polyethylene based resin on said heat sealable layer of low density polyethylene on the said interior surface of said substrate; and
5. a skin coat layer applied directly onto said tie layer, said skin coat layer comprising a polymer selected from the group consisting of polyamides and copolyamides.

2. A method according to claim 1 wherein said skin coat layer comprises nylon.

3. A method according to claim 1 wherein said laminate further comprises a first tie layer on the exterior surface of said skin coat layer.

4. A method according to claim 3 wherein said first tie layer comprises a modified low density polyethylene.

5. A method according to claim 4 wherein said heat sealable polymer comprises low density polyethylene.

6. A method according to claim 3 wherein said heat sealable polymer comprises low density polyethylene.

* * * * *